US008320572B2

(12) United States Patent
Liu et al.

(10) Patent No.: US 8,320,572 B2
(45) Date of Patent: Nov. 27, 2012

(54) ELECTRONIC APPARATUS COMPRISING MICROPHONE SYSTEM

(75) Inventors: Guangnuan Liu, Cupertino, CA (US); Shiang Steve Charng, Taipei (TW); Tom Hsia, Cupertino, CA (US)

(73) Assignee: Fortemedia, Inc., Sunnyvale, CA (US)

( * ) Notice: Subject to any disclaimer, the term of this patent is extended or adjusted under 35 U.S.C. 154(b) by 685 days.

(21) Appl. No.: 12/366,773

(22) Filed: Feb. 6, 2009

(65) Prior Publication Data

US 2010/0027809 A1 Feb. 4, 2010

Related U.S. Application Data

(60) Provisional application No. 61/085,056, filed on Jul. 31, 2008.

(51) Int. Cl.
*H04B 1/38* (2006.01)

(52) U.S. Cl. ........................................ 381/11; 381/94.1

(58) Field of Classification Search .................... 381/11, 381/94.1, 60
See application file for complete search history.

(56) References Cited

U.S. PATENT DOCUMENTS

| | | | | |
|---|---|---|---|---|
| 7,050,971 | B1 * | 5/2006 | Kaufholz | 704/226 |
| 2004/0051788 | A1 * | 3/2004 | Oka et al. | 348/211.99 |
| 2008/0285781 | A1 * | 11/2008 | Aerts et al. | 381/312 |

* cited by examiner

*Primary Examiner* — Howard Weiss
*Assistant Examiner* — Tifney Skyles
(74) *Attorney, Agent, or Firm* — McClure, Qualey & Rodack, LLP

(57) ABSTRACT

The invention provides a method for directing operation of a microphone system. In one embodiment, the microphone system comprises a plurality of component modules. First, a diagnostic test is performed to determine a diagnostic result indicating whether the component modules have failed the diagnostic test. Whether a plurality of required component modules corresponding to a current application mode for operating the microphone system have failed the diagnostic test is then determined according to the diagnostic result, wherein the application mode requires cooperation of the required component modules selected from the component modules of the microphone system. When some of the required component modules have failed the diagnostic test, the current application mode is changed to an altered application mode and the microphone system is directed to operate according to the altered application mode, wherein a plurality of second required component modules corresponding to the altered application mode are in good condition. When the required component modules are all in good condition, the microphone system is directed to operate according to the current application mode.

9 Claims, 8 Drawing Sheets

ELECTRONIC APPARATUS COMPRISING MICROPHONE SYSTEM

CROSS REFERENCE TO RELATED APPLICATIONS

This application claims the benefit of U.S. Provisional Application No. 61/085,056, filed Jul. 31, 2008, the entirety of which is/are incorporated by reference herein.

BACKGROUND OF THE INVENTION

1. Field of the Invention

The invention relates to microphone arrays, and more particularly to apparatus comprising microphone arrays.

2. Description of the Related Art

A microphone system with beamforming capability comprises a microphone array and a beamforming module. The microphone array comprises a plurality of microphones. When the microphone array is used to receive a sound, the microphones of the microphone array convert the sound into a plurality of audio signal with slight phase differences therebetween. The beamforming module then performs a beamforming process according to the phase differences of the audio signals to generate a beamforming signal comprising sound components originating from a certain direction requested by a user, thereby improving the quality of the beamforming signal.

Many electronic systems comprise a microphone system with beamforming capability. The microphone system, however, may fail due to damage to any one of the components thereof. For example, when one of the microphones of the microphone array of the microphone system is damaged, the beamforming module cannot derive the beamforming signal. In addition, when any of the microphones is deteriorated, thus, causing the beamforming module to fail, the microphone system also cannot generate a beamforming signal even if all microphones of the microphone array of the microphone system are still in a usable condition. The electronic system therefore cannot use the microphone system even though most components of the microphone system normally functions. Thus, a method for flexibly operating a microphone system is therefore required. In addition, when a microphone of a microphone array is damaged, performance of the entire microphone system is degraded. Thus, a method for properly operating a microphone system to extend the lifespan of microphones of the microphone system is also required.

BRIEF SUMMARY OF THE INVENTION

The invention provides a method for directing operation of a microphone system. In one embodiment, the microphone system comprises a plurality of component modules. First, a diagnostic test is performed to determine a diagnostic result indicating whether the component modules have failed the diagnostic test. Whether a plurality of required component modules corresponding to a current application mode for operating the microphone system have failed the diagnostic test is then determined according to the diagnostic result, wherein the application mode requires cooperation of the required component modules selected from the component modules of the microphone system. When some of the required component modules have failed the diagnostic test, the current application mode is changed to an altered application mode and the microphone system is directed to operate according to the altered application mode, wherein a plurality of second required component modules corresponding to the altered application mode are in good condition. When the required component modules are all in good condition, the microphone system is directed to operate according to the current application mode.

The invention provides an electronic apparatus. In one embodiment, the electronic apparatus comprises a microphone system and a controller. The microphone system comprises a plurality of component modules. The controller performs a diagnostic test to determine a diagnostic result indicating whether the component modules has failed the diagnostic test, determines whether a plurality of required component modules corresponding to a current application mode for operating the microphone system has failed the diagnostic test according to the diagnostic result, wherein the application mode requires cooperation of the required component modules selected from the component modules of the microphone system. When some of the required component modules have failed the diagnostic test, the controller changes the current application mode to an altered application mode corresponding with the diagnostic result and directs the microphone system to operate according to the altered application mode, wherein a plurality of second required component modules corresponding to the altered application mode are in good condition.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
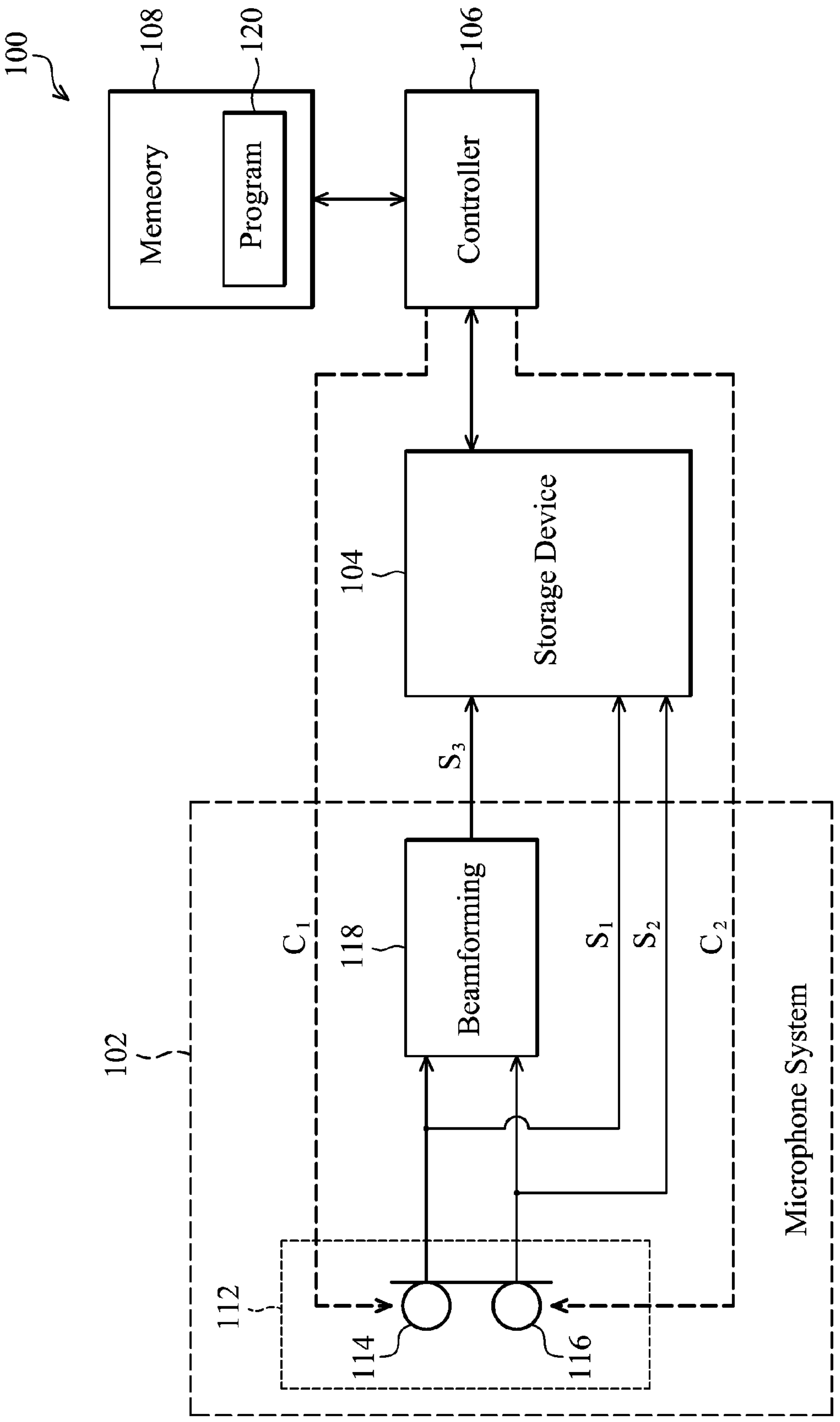
FIG. 1 is a block diagram of an apparatus comprising a microphone system according to the invention.

Referring to FIG. 1, a block diagram of an apparatus 100 comprising a microphone system 102 according to the invention is shown. The microphone system 102 converts external sounds into audio signals for the apparatus 100. The microphone system 102 comprises an array microphone 112 and a beamforming module 118. In one embodiment, the array microphone 112 comprises two microphones 114 and 116 converting a sound into audio signals $S_1$ and $S_2$. In another embodiment, the array microphone 112 comprises more than two microphones. After the array microphone 112 generates audio signals $S_1$ and $S_2$, the beamforming module 118 performs a beamforming process according to the audio signals $S_1$ and $S_2$ to obtain a beamforming signal $S_3$ comprising sound components originating from a certain direction requested by the apparatus 100.

In addition to the microphone system 102, the apparatus 100 also comprises a storage device 104, a controller 106, and a memory 108. The storage device 104 stores the beamforming signal $S_3$ or the audio signals $S_1$ and $S_2$ generated by the microphone system 102. The controller 106 then accesses the audio signals $S_1$ and $S_2$ and the beamforming signal $S_3$ stored in the storage device 104 for further signal processing. The controller 106 is a core of the apparatus 100 and controls other component modules of the apparatus 100. A program 120 for operating the microphone system 102 is stored in the memory 108, and the controller 106 executes codes of the program 120 to control operation of the microphone system 102. In one embodiment, the apparatus 100 is a notebook, a computer, a mobile phone, a personal digital assistant (PDA), or a monitor device.

Figure 2:
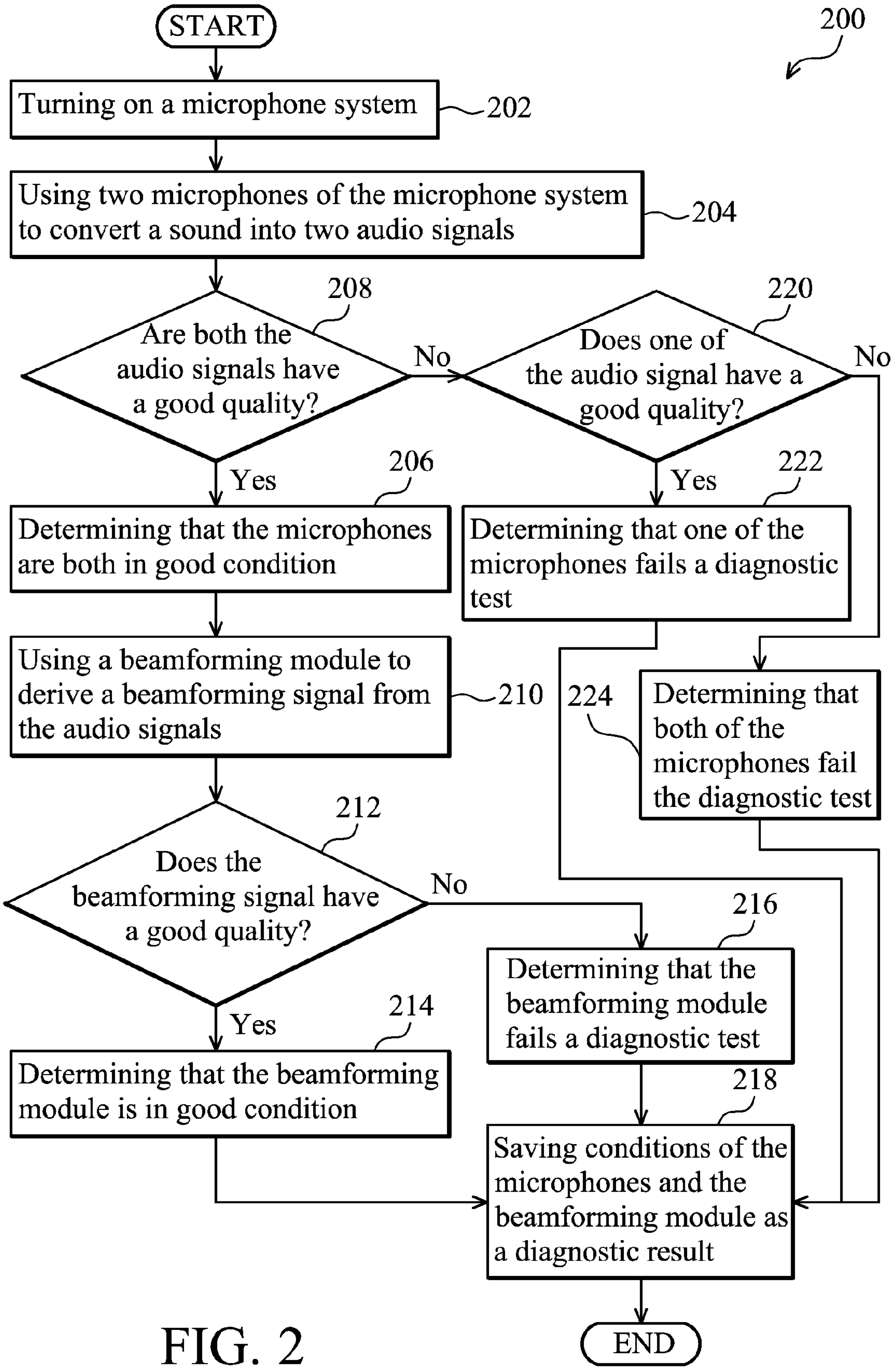
FIG. 2 is a method for performing a diagnostic test to evaluate a condition of component modules of a microphone system according to the invention.

Before the controller 106 determines an operating mode of the microphone system 102, the controller 106 must determine whether component modules of the microphone system 102 are in a good condition or damaged. The controller 106 must therefore perform a diagnostic test to evaluate a condition of component modules of the microphone system 102. Referring to FIG. 2, a method 200 for performing a diagnostic test to evaluate a condition of component modules of the microphone system 102 according to the invention is shown. In one embodiment, the controller 106 executes a portion of the program 120 to perform the method 200. First, the controller 106 turns on the microphone system 102 (step 202). The controller 106 then uses the microphones 114 and 116 of the microphone system 102 to convert a sound into two audio signals $S_1$ and $S_2$. In one embodiment, the sound is a voice generated by a user of the apparatus 100.

After the audio signals $S_1$ and $S_2$ are generated, the controller 106 determines whether the microphones 114 and 116 have failed the diagnostic test according to the audio signals $S_1$ and $S_2$. When both of the audio signals $S_1$ and $S_2$ have good quality (step 208), the controller 106 determines that the microphones 114 and 116 are both in good condition (step 206) and have passed the diagnostic test. In one embodiment, the controller 106 checks whether the amplitudes of the audio signals $S_1$ and $S_2$ exceed a threshold to determine conditions of the microphones 114 and 116. The controller 106 then uses the beamforming module 118 to derive a beamforming signal $S_3$ from the audio signals $S_1$ and $S_2$ (step 210). The controller 106 then determines whether the beamforming module 118 fails the diagnostic test according to the beamforming signal $S_3$. When the beamforming signal $S_3$ has a good quality (step 212), the controller 106 determines that the beamforming module 118 is in good condition (step 214) and has passed the diagnostic test. Otherwise, the controller 106 determines that the beamforming module 118 has failed the diagnostic test (step 216). If only one of the audio signals $S_1$ and $S_2$ has a good quality (step 220), the controller 106 determines that one of the microphones 114 and 116 has failed the diagnostic test (step 222). Otherwise, the controller 106 determines that both of the microphones 114 and 116 have failed the diagnostic test (step 224). Finally, the controller 106 saves conditions of the microphones 114 and 116 and the beamforming module 118 as a diagnostic result (step 218). In one embodiment, the diagnostic result is stored in the storage device 104.

Figure 3:
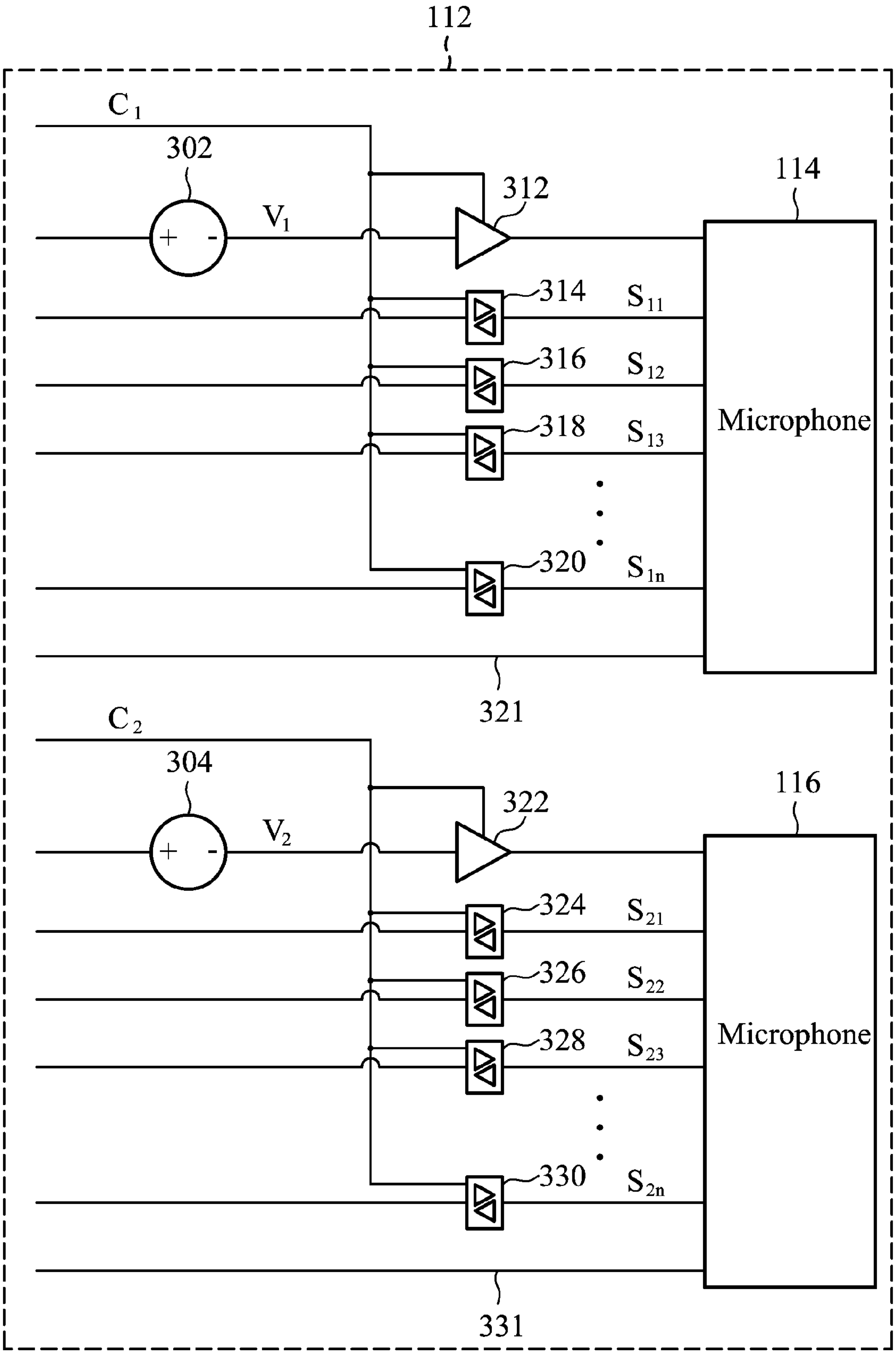
FIG. 3 is a detailed circuit diagram of microphones of a microphone system according to the invention.

To extend a lifespan of the microphones 114 and 116, the controller 106 turns off the microphones 114 and 116 when the apparatus 100 performs applications irrelevant to the microphone system 102. The controller 106 sends control signals $C_1$ and $C_2$ to enable or disable the microphones 114 and 116. Referring to FIG. 3, a detailed circuit diagram of the microphones 114 and 116 according to the invention is shown. Power suppliers 302 and 304 provide power supply $V_1$ and $V_2$ for the microphones 114 and 116. Electrostatic proof lines 321 and 331 are coupled to the microphones 114 and 116 for electrostatic proof. Signals $S_{11}$, $S_{12}$, $S_{13}$, . . . , and $S_{1n}$ are transmitted between the microphone 114 and the controller 106. Similarly, signals $S_{21}$, $S_{22}$, $S_{23}$, . . . , and $S_{2n}$ are transmitted between the microphone 116 and the controller 106. A plurality of switches 312~320 controlled by the control signal $C_1$ are coupled to the signal paths $S_{11}$~$S_{1n}$ and the power path $V_1$. Thus, the controller 106 can disable the control signal $C_1$ to cut off the power path $V_1$ supplied to the microphone 114 and the signal paths $S_{11}$~$S_{1n}$ coupled between the microphone 114 and the controller 106. Similarly, a plurality of switches 322~330 controlled by the control signal $C_2$ are coupled to the signal paths $S_{11}$~$S_{1n}$ and the power path $V_1$. Thus, the controller 106 can disable the control signal $C_2$ to cut off the power path $V_2$ supplied to the microphone 116 and the signal paths $S_{21}$~$S_{2n}$ coupled between the microphone 116 and the controller 106. Because the controller 106 shuts off the electrical power supply of the microphones 114 and 116 when the microphone system 102 is not being used, the lifespan of the microphones 114 and 116 is extended.

The controller 106 then compares component modules of the microphone system 102 requested by a current application mode with the previously stored diagnostic result to determine whether to change the current application mode for the microphone system 102. In one embodiment, there are three kinds of application modes including a mono mode, a stereo mode, and a beamforming mode for the microphone system 102. When the microphone system 102 is requested to operate in a mono mode, only one audio signal generated by one of the microphones 114 and 116 is required by an application. The required component module is therefore only one of the microphones 114 and 116. When the microphone system 102 is requested to operate in a stereo mode, the audio signals $S_1$ and $S_2$ generated by the microphones 114 and 116 are both required by an application. The required component modules are therefore both of the microphones 114 and 116. When the microphone system 102 is requested to operate in a beamforming mode, a beamforming signal generated by the beamforming nodule 118 is required by an application. The required component modules therefore include the beamforming module 118 and both of the microphones 114 and 116.

Figure 4:
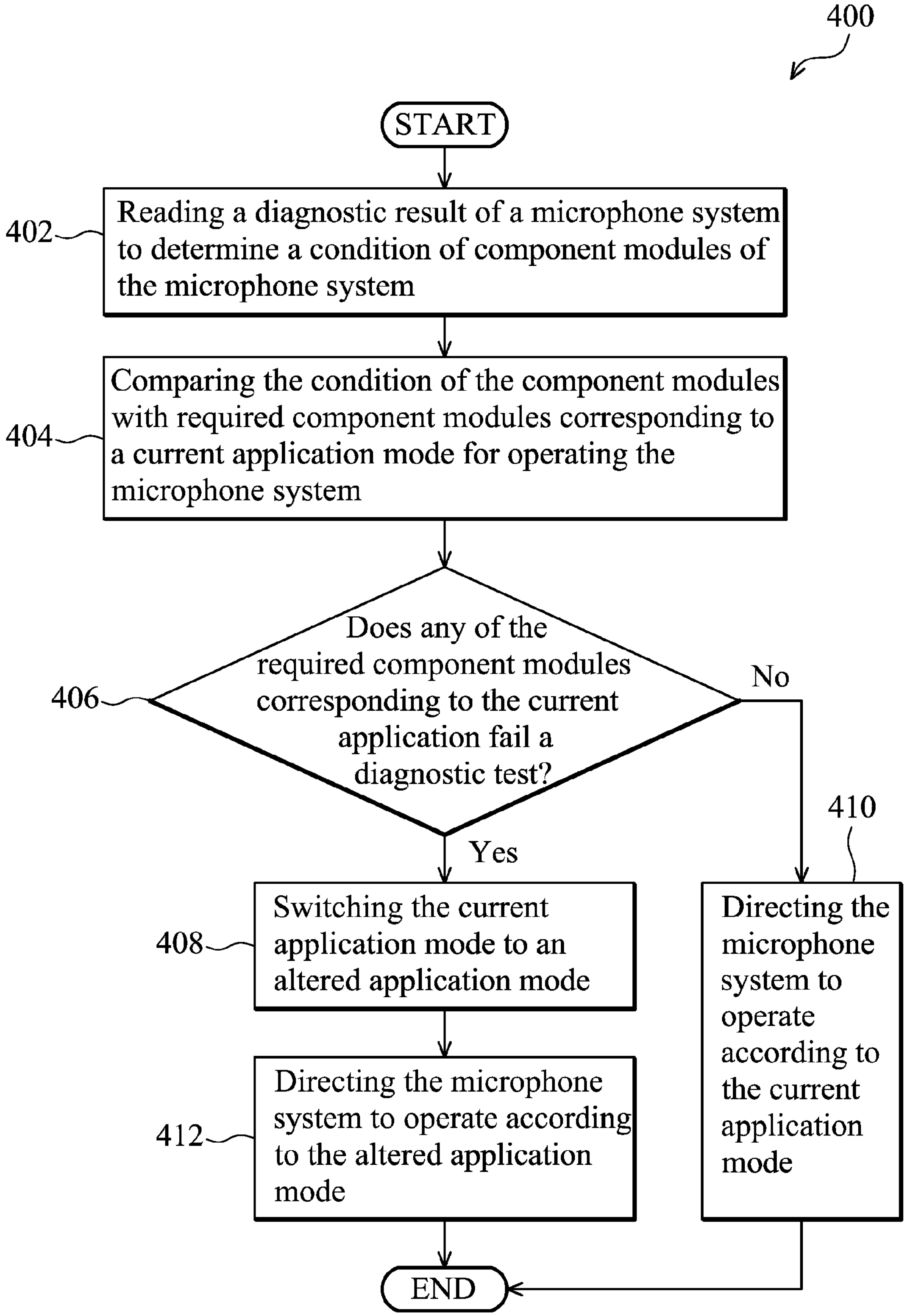
FIG. 4 is a flowchart of a method for dynamically operating a microphone system according to diagnostic results according to the invention.

Referring to FIG. 4, a flowchart of a method 400 for dynamically operating the microphone system 102 according to diagnostic results according to the invention is shown. In one embodiment, the controller 106 executes a portion of the program 120 to perform the method 400. First, the controller 106 reads a diagnostic result of the microphone system 102 from the storage device 104 to understand a condition of component modules of the microphone system 102 (step 402). The controller 106 then compares the condition of the component modules with the required component modules corresponding to a current application mode for operating the microphone system 102 (step 404). When any of the required component modules corresponding to the current application fails the diagnostic test (step 406), the controller 106 switches the current application mode to an altered application mode corresponding with the condition of the microphone system 102 (step 408), wherein component modules required by the altered application mode are in good condition. The microphone system 102 is then directed to operate according to the altered application mode (step 412). When all of the required component modules corresponding to the current application mode are in good condition (step 406), the microphone system 102 is then directed to operate according to the current application mode (step 410).

Figure 5:
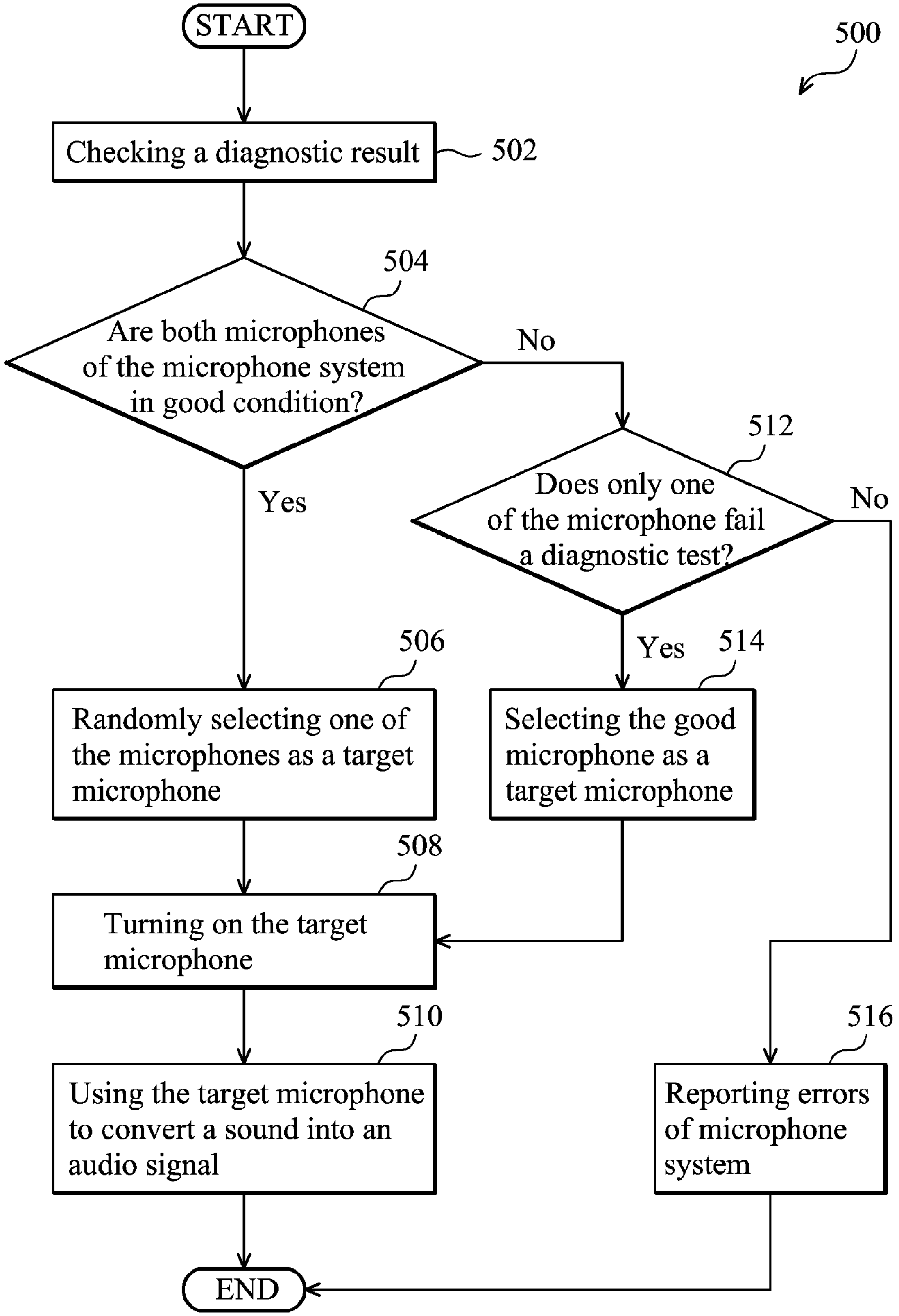
FIG. 5 is a detailed flowchart of a method for operating a microphone system in a mono mode according to the invention.

Referring to FIG. 5, a detailed flowchart of a method 500 for operating the microphone system 102 in a mono mode according to the invention is shown. When a current application mode for the microphone system 102 is a mono mode, only one of the microphones 114 and 116 is required. The controller 106 then checks the diagnostic result to determine a condition of the microphones 114 and 116 (step 502). If the microphones 114 and 116 of the microphone system are both in good condition (step 504), the controller 106 randomly selects one of the microphones 114 and 116 as a target microphone (step 506), turns on the target microphone (step 508), and then uses the target microphone to convert a sound into an audio signal (step 510). If only one of the microphones 114 and 116 fails the diagnostic test (step 512), the controller 106 selects the good microphone as the target microphone (step 514), turns on the good microphone (step 508), and then uses the good microphone to convert a sound into an audio signal (step 510). Otherwise, when the microphones 114 and 116 of the microphone system both fail the diagnostic test, the microphone system 102 cannot operate, and the controller 106 reports errors of the microphone system 102 to the user (step 516).

Figure 6:
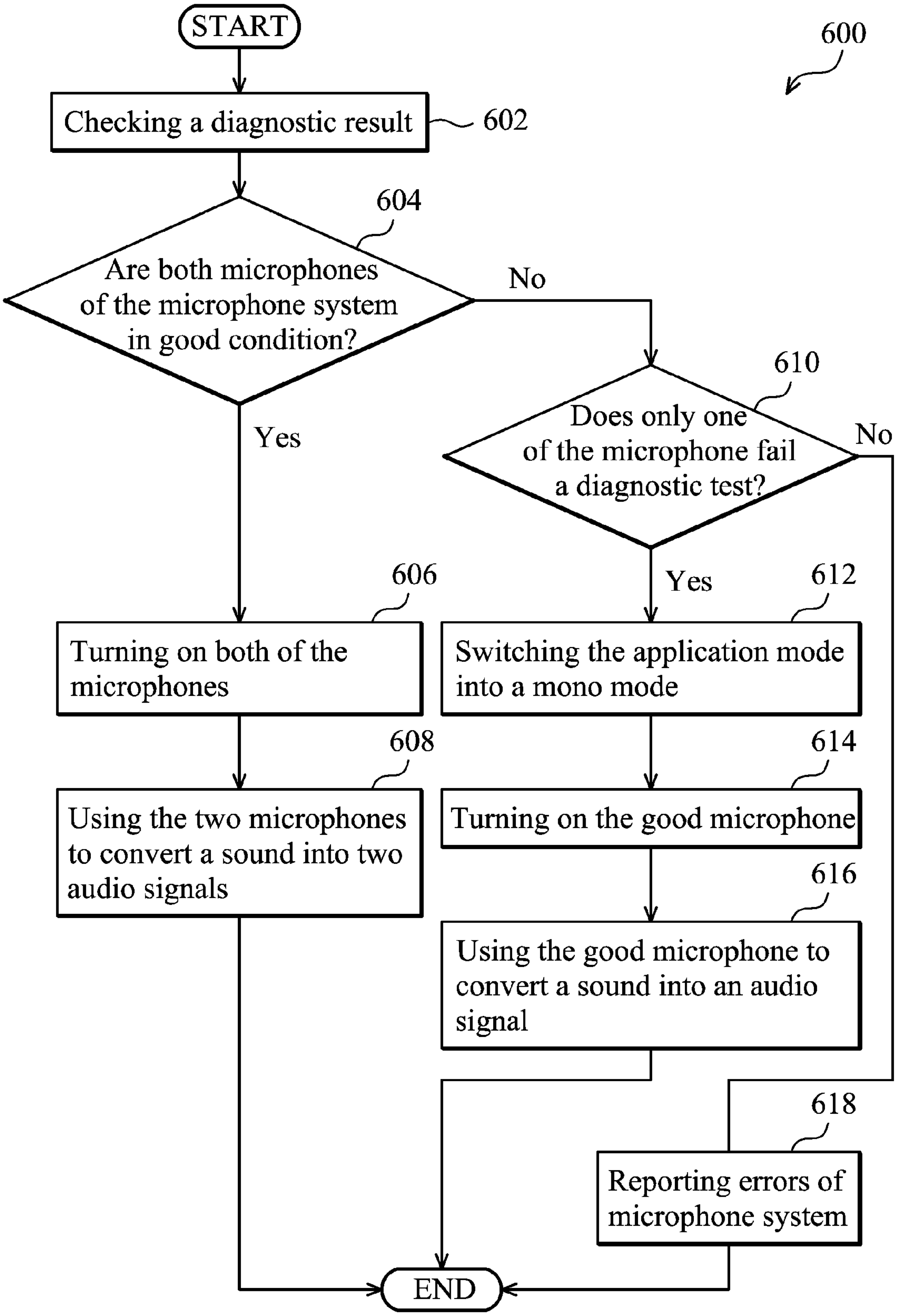
FIG. 6 is a detailed flowchart of a method for operating a microphone system in a stereo mode according to the invention.

Referring to FIG. 6, a detailed flowchart of a method 600 for operating the microphone system 102 in a stereo mode according to the invention is shown. When a current application mode for the microphone system 102 is a stereo mode, both of the microphones 114 and 116 are required. The controller 106 then checking the diagnostic result to determine a condition of the microphones 114 and 116 (step 602). If the microphones 114 and 116 of the microphone system are both in good condition (step 604), the controller 106 turns on both of the microphones 114 and 116 (step 606), and then uses the microphones 114 and 116 to convert a sound into audio signals $S_1$ and $S_2$ (step 608), and delivers the audio signals $S_1$ and $S_2$ to the controller 106. If only one of the microphones 114 and 116 fails the diagnostic test (step 610), the controller 106 changes the current application mode from the stereo mode into a mono mode (step 612), turns on the good microphone (step 614), and then uses the good microphone to convert a sound into an audio signal (step 616). Otherwise, when the microphones 114 and 116 of the microphone system both fail the diagnostic test, the microphone system 102 cannot operate, and the controller 106 reports errors of the microphone system 102 to the user (step 618).

Figure 7A:
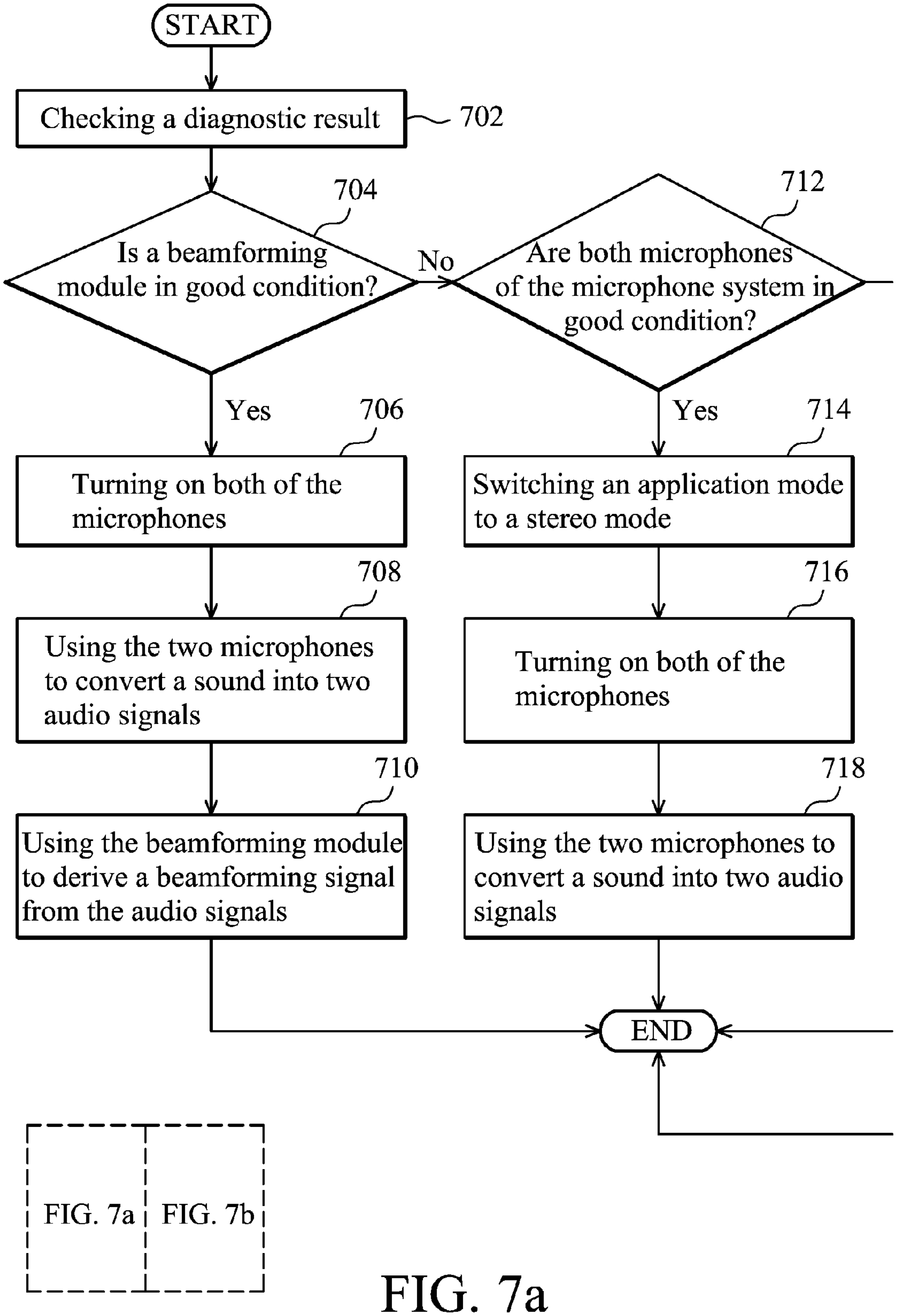
FIG. 7 is a detailed flowchart of a method for operating a microphone system in a beamforming mode according to the invention.
Figure 7B:
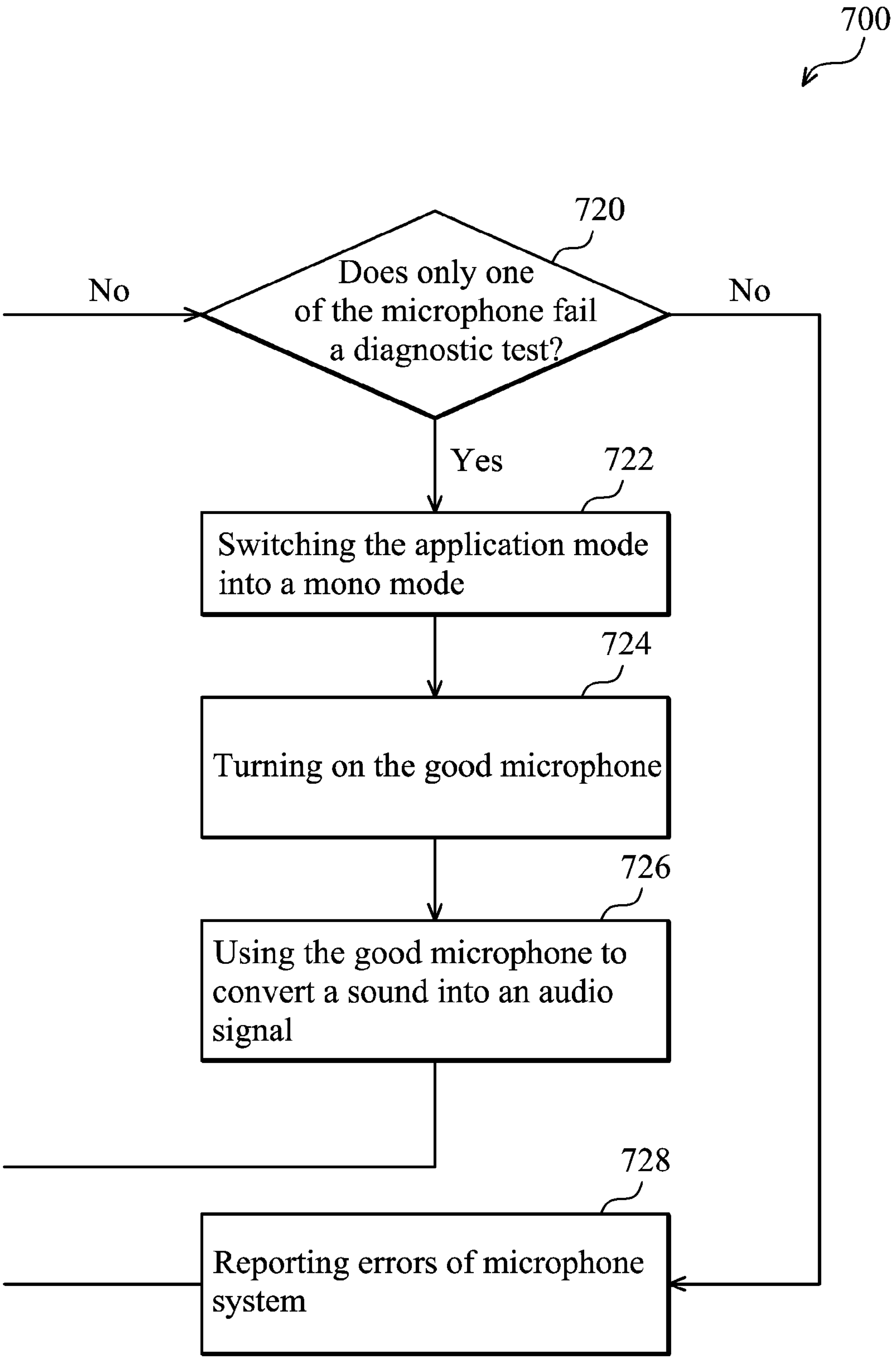

Referring to FIG. 7, a detailed flowchart of a method 700 for operating the microphone system 102 in a beamforming mode according to the invention is shown. When a current application mode for the microphone system 102 is a beamforming mode, the beamforming module 118 and the microphones 114 and 116 are all required. The controller 106 checks the diagnostic result to determine a condition of the microphones 114 and 116 (step 702). If the beamforming module 118 is in good condition (step 704), the controller 106 turns on both of the microphones 114 and 116 (step 706), uses the microphones 114 and 116 to convert a sound into audio signals $S_1$ and $S_2$ (step 708), uses the beamforming module 118 to derive a beamforming signal $S_3$ from the audio signals $S_1$ and $S_2$ (step 710), and delivers the audio signals $S_3$ to the controller 106.

Otherwise, although the beamforming module 118 fails the diagnostic test, if the microphones 114 and 116 of the microphone system are both in good condition (step 712), the controller 106 changes the current application mode from the beamforming mode to a stereo mode (step 714), turns on both of the microphones 114 and 116 (step 716), then uses the microphones 114 and 116 to convert a sound into audio signals $S_1$ and $S_2$ (step 718), and delivers the audio signals $S_1$ and $S_2$ to the controller 106. If only one of the microphones 114 and 116 fails the diagnostic test (step 720), the controller 106 changes the current application mode from the beamforming mode into a mono mode (step 722), turns on the good microphone (step 724), and then uses the good microphone to convert a sound into an audio signal (step 726). Otherwise, when the microphones 114 and 116 of the microphone system both fail the diagnostic test, the microphone system 102 cannot operate, and the controller 106 reports errors of the microphone system 102 to the user (step 728).

The invention provides a method for dynamically operating a microphone system according to a condition of component modules of the microphone system. Even if some component modules of the microphone system fail the diagnostic test, a controller selects an optimal application mode corresponding with the condition of the microphone system for operating the microphone system. In addition, when the microphone system is not being used, the microphones of the microphone system are turned off to extend a lifespan of the microphones.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus, comprising:

a microphone system, comprising a plurality of component modules, wherein the component modules comprise a plurality of microphones of an array microphone and a beamforming module; and a controller, performing a diagnostic test to determine a diagnostic result indicating whether the microphone modules and the beamforming modules of the component modules have failed the diagnostic test, determining whether a plurality of required component modules corresponding to a current application mode for operating the microphone system have failed the diagnostic test according to the diagnostic result, and when some of the required component modules has failed the diagnostic test, changing the current application mode to an altered application mode corresponding with the diagnostic result and directing the microphone system to operate according to the altered application mode, wherein the application mode requires cooperation of the required component modules selected from the component modules of the microphone system, and a plurality of second required component modules corresponding to the altered application mode are in good condition;

wherein the controller comprises a mono-mode circuit which operates when a current application mode is a mono mode, and the mono-mode circuit directs operation of the microphone system as follows:

when more than one of the microphones are in good condition, the controller randomly selects a target microphone from the microphones in good condition and uses the target microphone to generate an audio signal;

when only one of the microphones is in good condition, the controller uses only the microphone in good condition to generate an audio signal; and when all of the microphones have failed the diagnostic test, the controller reports errors of the microphone system.

2. The electronic apparatus as claimed in claim 1, wherein the microphone system comprises:

the array microphone, comprising the microphones converting a sound into a plurality of audio signals; and the beamforming module, performing a beamforming process to derive a beamforming signal from the audio signals.

3. The electronic apparatus as claimed in claim 1, wherein the electronic apparatus is a notebook, a mobile phone, a personal digital assistant (PDA), or a monitor device.

4. The electronic apparatus as claimed in claim 2, wherein the current application mode and the altered application mode are selected from a group comprising the mono mode, a stereo mode, and a beamforming mode, wherein the mono mode uses only one of the microphones, the stereo mode uses all of the microphones, and the beamforming mode requires all of the microphones and the beamforming module.

5. The electronic apparatus as claimed in claim 1, wherein the controller comprises a stereo-mode circuit which operates when the current application mode is a stereo mode, the stereo-mode circuit directs operation of the microphone system as follows:

when all of the microphones are in good condition, the controller uses the microphones to generate a plurality of audio signals;

when only one of the microphones is in good condition, the controller changes the current application mode to the mono mode and uses only the microphone in good condition to generate an audio signal; and when all of the microphones have failed the diagnostic test, the controller reports errors of the microphone system.

6. The electronic apparatus as claimed in claim 1, wherein the controller comprises a beamforming-mode circuit which operates when the current application mode is a beamforming mode, the beamforming-mode circuit directs operation of the microphone system as follows:

when the beamforming module and all of the microphones are in good condition, the controller uses the microphones to generate a plurality of audio signals, and uses the beamforming module to derive a beamforming signal from the audio signals;

when all of the microphones are in good condition but the beamforming module fails, the controller changes the current application mode to the stereo mode and uses the microphones to generate a plurality of audio signals;

when only one of the microphones is in good condition, the controller changes the current application mode to the mono mode and uses only the microphone in good condition to generate an audio signal; and when all of the microphones have failed the diagnostic test, the controller reports errors of the microphone system.

7. The electronic apparatus as claimed in claim 2, wherein the controller cuts off a power supply to the microphones when the microphone system is not used, thereby extending a lifespan of the microphones.

8. The electronic apparatus as claimed in claim 2, wherein the controller uses the microphones to convert a sound into a plurality of audio signals, determines whether the microphones have failed the diagnostic test according to quality of the audio signals, uses the beamforming module to derive a beamforming signal from the audio signals, and determines whether the beamforming module has failed the diagnostic test according to a quality of the beamforming signal.

9. The electronic apparatus as claimed in claim 8, wherein the controller measures amplitudes of the audio signals, and determines that the microphones generating the audio signals are in good condition when the amplitudes of the audio signals exceed a threshold.

* * * * *